United States Patent
Lee et al.

(10) Patent No.: US 9,048,683 B2
(45) Date of Patent: Jun. 2, 2015

(54) METHOD FOR CONTROLLING CHARGING POWER AND WIRELESS CHARGING APPARATUS FOR THE SAME

(71) Applicant: Samsung Electronics Co., Ltd., Gyeonggi-do (KR)

(72) Inventors: Kyung-Woo Lee, Gyeonggi-do (KR); Yu-Su Kim, Gyeonggi-do (KR); Kang-Ho Byun, Gyeonggi-do (KR); Sung-Ku Yeo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 406 days.

(21) Appl. No.: 13/656,040

(22) Filed: Oct. 19, 2012

(65) Prior Publication Data

US 2013/0099732 A1 Apr. 25, 2013

(30) Foreign Application Priority Data

Oct. 21, 2011 (KR) .................. 10-2011-0107960

(51) Int. Cl.
*H02J 7/00* (2006.01)
*H01F 27/42* (2006.01)
*H02J 7/02* (2006.01)

(52) U.S. Cl.
CPC .................... *H02J 7/025* (2013.01)

(58) Field of Classification Search
USPC ........................... 320/108; 307/104
See application file for complete search history.

(56) References Cited

U.S. PATENT DOCUMENTS

| 4,355,414 | A * | 10/1982 | Inoue ................. 455/184.1 |
| 2007/0197176 | A1* | 8/2007 | Kobayashi et al. ........ 455/205 |
| 2007/0252485 | A1* | 11/2007 | Kawakubo et al. ........ 310/365 |
| 2009/0093690 | A1* | 4/2009 | Yoshizawa .............. 600/300 |
| 2010/0255802 | A1* | 10/2010 | Pan et al. ............... 455/216 |
| 2011/0101788 | A1* | 5/2011 | Sun et al. ............... 307/104 |
| 2012/0100636 | A1* | 4/2012 | Johal et al. ............. 436/501 |
| 2012/0193993 | A1* | 8/2012 | Azancot et al. ........... 307/104 |
| 2012/0311356 | A1* | 12/2012 | Tan ...................... 713/310 |

* cited by examiner

*Primary Examiner* — M'Baye Diao
(74) *Attorney, Agent, or Firm* — The Farrell Law Firm, P.C.

(57) ABSTRACT

Disclosed is a method for advance detection of output power, before arrival at a boundary frequency between an inband and an outband during frequency tracking in a wireless charging apparatus, the wireless charging apparatus including a first resonator resonating at a lower-limit frequency of the inband and a second resonator resonating at an upper-limit frequency of the inband, to adaptively adjust the frequency based on the power values output from the first and second resonators, and to determine a power transmission control value corresponding to the adjusted frequency, thereby enabling frequency control and power control within the inband.

15 Claims, 5 Drawing Sheets

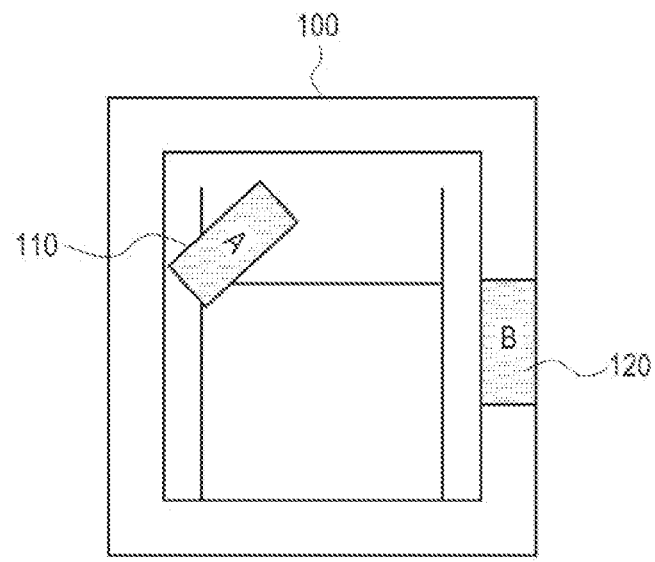
FIG.1
(PRIOR ART)
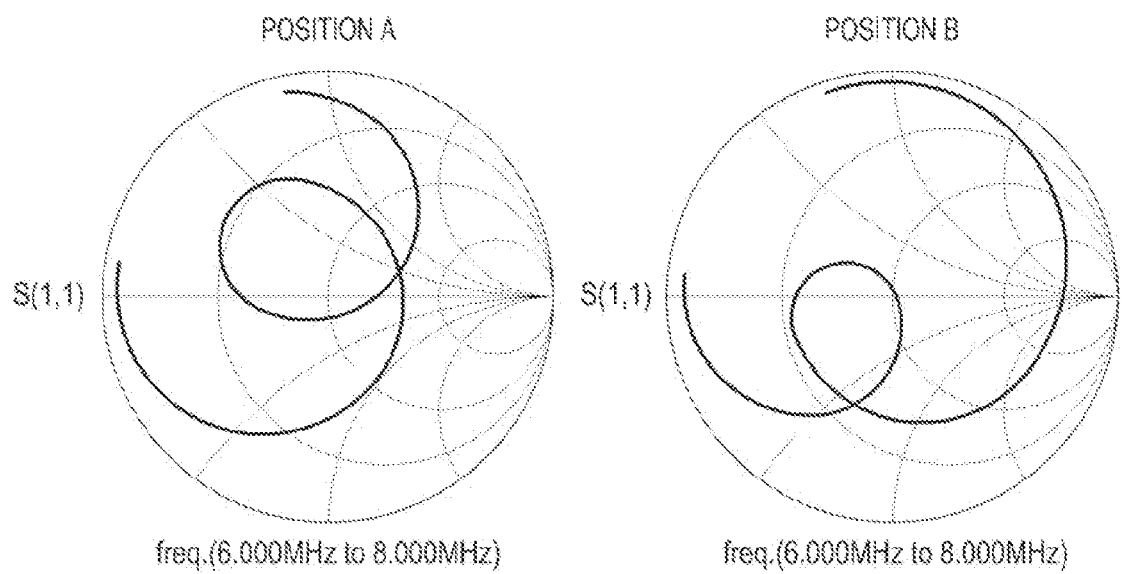
FIG.2A
(PRIOR ART)
FIG.2B
(PRIOR ART)

METHOD FOR CONTROLLING CHARGING POWER AND WIRELESS CHARGING APPARATUS FOR THE SAME

PRIORITY

This application claims priority under 35 U.S.C. §119(a) to a Korean Patent Application filed in the Korean Intellectual Property Office on Oct. 21, 2011, and assigned Serial No. 10-2011-0107960, the entire disclosure of which is incorporated herein by reference.

BACKGROUND OF THE INVENTION

1. Field of the Invention

The present invention relates generally to a wireless charging apparatus and more particularly, to a method for controlling charging power and a wireless charging apparatus for the same.

2. Description of the Related Art

Mobile terminals should be continuously provided with power, in order to operate. To this end, mobile terminals are equipped with a rechargeable battery, which is generally recharged by a charger. To support portability of the mobile terminals, studies have been conducted on non-contact or wireless charging. For wireless charging, the position where a mobile terminal, or a target to be charged, is placed on a charging deck of a wireless charging apparatus for charging the mobile terminal is a key factor that determines charging efficiency.

In the wireless charging system, the impedance varies depending on the position of the mobile terminal on the wireless charging apparatus, as described in detail with reference to FIGS. 1, 2A and 2B. FIGS. 1, 2A and 2B illustrate changes in frequency that occur when a target 110 to be charged is placed at a position "A" and at a position "B" of another target 120 on a charging deck of a wireless charging apparatus 100.

Referring to FIG. 1, the impedance will vary depending on the position where the target to be charged is placed, and the number of targets to be charged. Based on a reference frequency of 6.78 MHz, an effect of frequency changes on a target 110 placed at position A are shown in FIG. 2A, and frequency changes on the other target 120 placed at the position B are shown in FIG. 2B. Although the wireless charging apparatus 100 should output 6.78 MHz as a reference frequency, a frequency capable of providing improved efficiency for each different position will change, since the frequency varies depending on the position of the target to be charged.

Experimental results indicate that different positions have different efficiencies, as shown in Table 1 below.

TABLE 1

| Position | Reference Frequency (MHz) | Voltage (V) | Input Current (mA) | Power (mW) | Output Power (mW) | Efficiency (Rx output/ Tx input) |
|---|---|---|---|---|---|---|
| A | 6.78 | 7 | 280 | 1960 | 1086 | 55.4% |
| B | 6.78 | 7 | 204 | 1428 | 729 | 51.1% |

Referring to Table 1, an efficiency difference between targets 110 and 120 placed at position A and position B, respectively, is 4.3%. In addition, when the maximum and minimum efficiencies are measured in different positions of the target to be charged, an efficiency difference is about 7.5%. Since the efficiency is reduced due to the changes in impedance in different positions of the target to be charged on the wireless charging apparatus 100, frequency tracking for making up for the efficiency reduction is required. This frequency tracking refers to determining a frequency that minimizes the efficiency difference between different positions, by shifting the frequency to a maximum efficiency point for the changed impedance by adjusting the frequency within an inband permitted by frequency regulations.

A structure of a conventional wireless charging apparatus for determining the optimal frequency is described with reference to FIG. 3. Referring to FIG. 3, the conventional wireless charging apparatus has a Phase Locked Loop (PLL) 410 that receives a feedback output from a wireless power transmitter 400, and finds and tracks the optimal output frequency by adjusting the frequency.

In this conventional apparatus, the PLL performs frequency tracking by adjusting the frequency. However, regulations establishing allowable output power at each frequency are strict, as set forth in the frequency regulations. Specifically, when frequency tracking is performed within the inband permitted by the frequency regulations, regulations on the output power are not restrictive, whereas when frequency tracking is performed in an outband, regulations on the output power are very strict.

However, the conventional wireless charging apparatus with a PLL will monitor the output power at the shifted frequency after shifting the frequency. In other words, the conventional apparatus merely measures the power at the reference frequency. For a reference frequency of 6.78 MHz, an inband is 6.78 MHz±15 kHz. Therefore, when power exceeding the power limit before arrival at the boundary frequency (e.g., 6.765 MHz or 6.795 MHz) between the inband and the outband occurs in the outband, the conventional apparatus cannot provide advance detection.

In addition, since the PLL is a relatively expensive device, in addition to a need for a frequency tracking method capable of replacing the PLL-based method, there is also a need for a method capable of complying with the frequency regulations by detecting the output exceeding the power limit.

SUMMARY OF THE INVENTION

An aspect of an embodiment of the present invention is to provide a method for controlling charging power by frequency tracking and a wireless charging apparatus for the same.

Another aspect of an embodiment of the present invention is to provide a wireless charging apparatus and method capable of advance detection of output power before arrival at the boundary frequency between an inband and an outband during frequency tracking.

In accordance with one aspect of the present invention, there is provided a wireless charging apparatus for controlling charging power when charging a target. The apparatus includes a Voltage Control Oscillator (VCO) for outputting a resonant frequency corresponding to a first power transmission control value; a wireless power transmitter for outputting power determined by the resonant frequency to the target to be charged; a first resonator connected to the wireless power transmitter for outputting a first power value at a lower-limit frequency of a predetermined frequency band; a second resonator connected to the wireless power transmitter for outputting a second power value at an upper-limit frequency of the predetermined frequency band; and a controller for adjusting the first power transmission control value for adjusting the resonant frequency if any one of the first and second power values from the first and second resonators exceeds a power limit.

In accordance with another aspect of the present invention, there is provided a method for controlling charging power in a wireless charging apparatus with a wireless power transmitter. The method includes outputting power determined by a resonant frequency to a target to be charged, by the wireless power transmitter; monitoring a first power value at a lower-limit frequency and a second power value at an upper-limit frequency from the wireless power transmitter while outputting the power; determining whether any one of the first and second power values exceeds a power limit; and adjusting the resonant frequency if any one of the first and second power values exceeds the power limit.

BRIEF DESCRIPTION OF THE DRAWINGS

The above and other aspects, features and advantages of certain embodiments of the present invention will be more apparent from the following description taken in conjunction with the accompanying drawings, in which:

FIG. 1 illustrates positioning of a target to be charged on a charging deck of a wireless charging apparatus;

FIGS. 2A and 2B illustrate changes in frequency when the target is placed in the different positions shown in FIG. 1;

DETAILED DESCRIPTION OF EMBODIMENTS OF THE PRESENT INVENTION

Embodiments of the present invention will now be described in detail with reference to the accompanying drawings. In the following description, specific details such as detailed configuration and components are merely provided to assist the overall understanding of the embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The present invention provides a method capable of advance detection of output power before arrival at a boundary frequency between an inband and an outband during frequency tracking in a wireless charging apparatus. To this end, the wireless charging apparatus of the present invention includes a first resonator resonating at a lower-limit frequency of the inband, and a second resonator resonating at an upper-limit frequency of the inband. Based on power values output from the first and second resonators, the wireless charging apparatus adaptively adjusts the frequency and determines a power transmission control value corresponding to the adjusted frequency, thereby allowing frequency control and power control within the inband.

Figure 3:
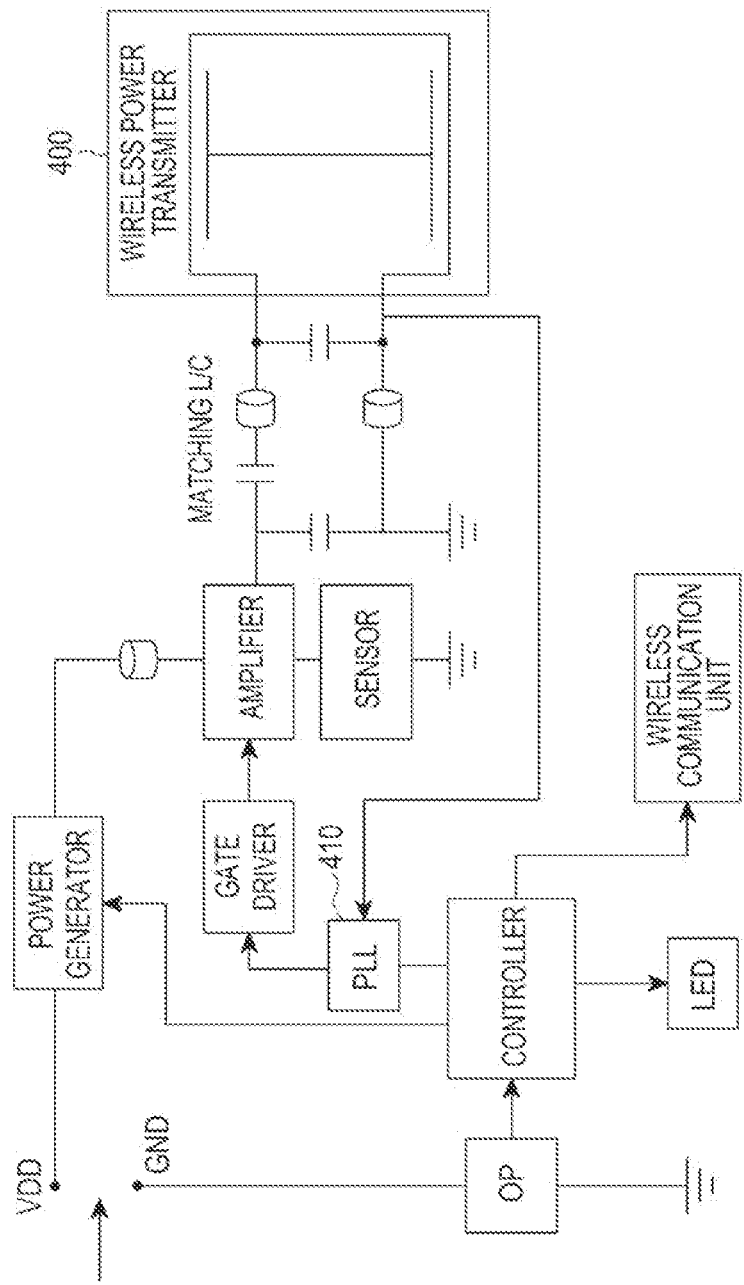
FIG. 3 illustrates a structure of a conventional wireless charging apparatus.
Figure 4A:
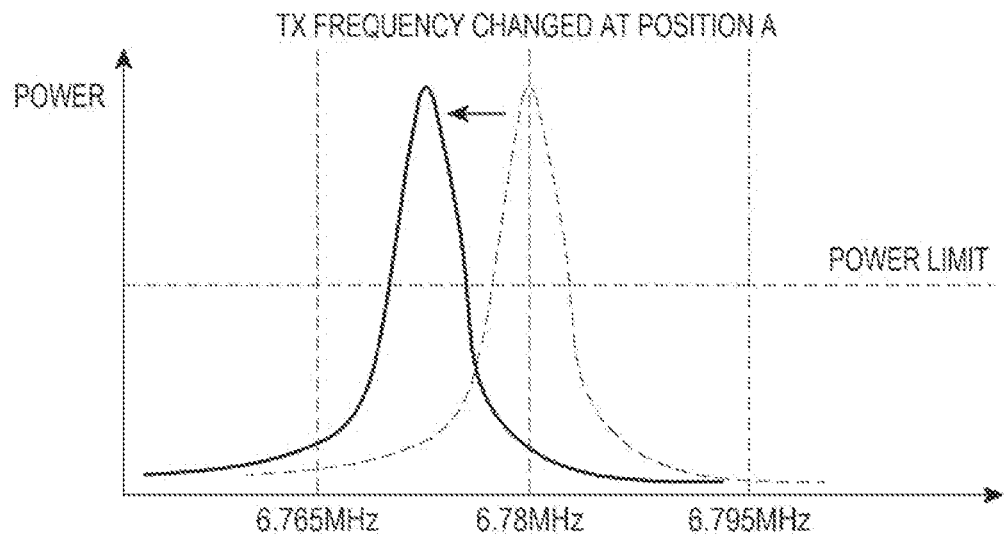
FIGS. 4A and 4B provide examples of shifting frequency in different positions of a target to be charged.
Figure 4B:
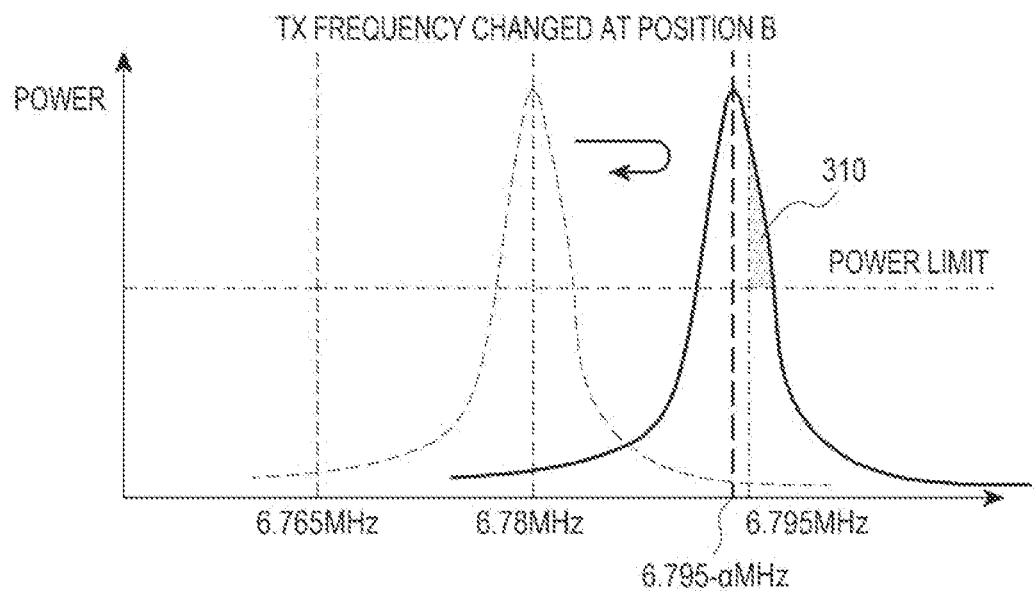

The operation principles of a frequency tracking method used in embodiments of the present invention are briefly described, with a detailed description thereof provided with reference to FIGS. 4A and 4B. For a reference frequency of 6.78 MHz, an inband is 6.78 MHz±15 kHz. FIG. 4A illustrates an example of down-shifting the frequency to output an optimal efficient frequency to target 110 to be charged when placed in position A, and FIG. 4B illustrates an example of up-shifting the frequency for target 120 to be charged when placed in position B.

For example, when a center axis is located at a frequency of 6.795-α MHz, as shown in FIG. 4B, a region 310 where power has already exceeded the power limit may occur in advance at the frequency of 6.795 MHz or more. Therefore, when power exceeding the power limit before arrival at the boundary frequency (e.g., 6.765 MHz or 6.795 MHz) occurs in the outband, the conventional apparatus cannot provide advance detection. There is also a need for a method capable of complying with the frequency regulations by detecting the output exceeding the power limit.

A structure and operation of the wireless charging apparatus for controlling charging power by frequency tracking is described with reference to FIG. 5.

Figure 5:
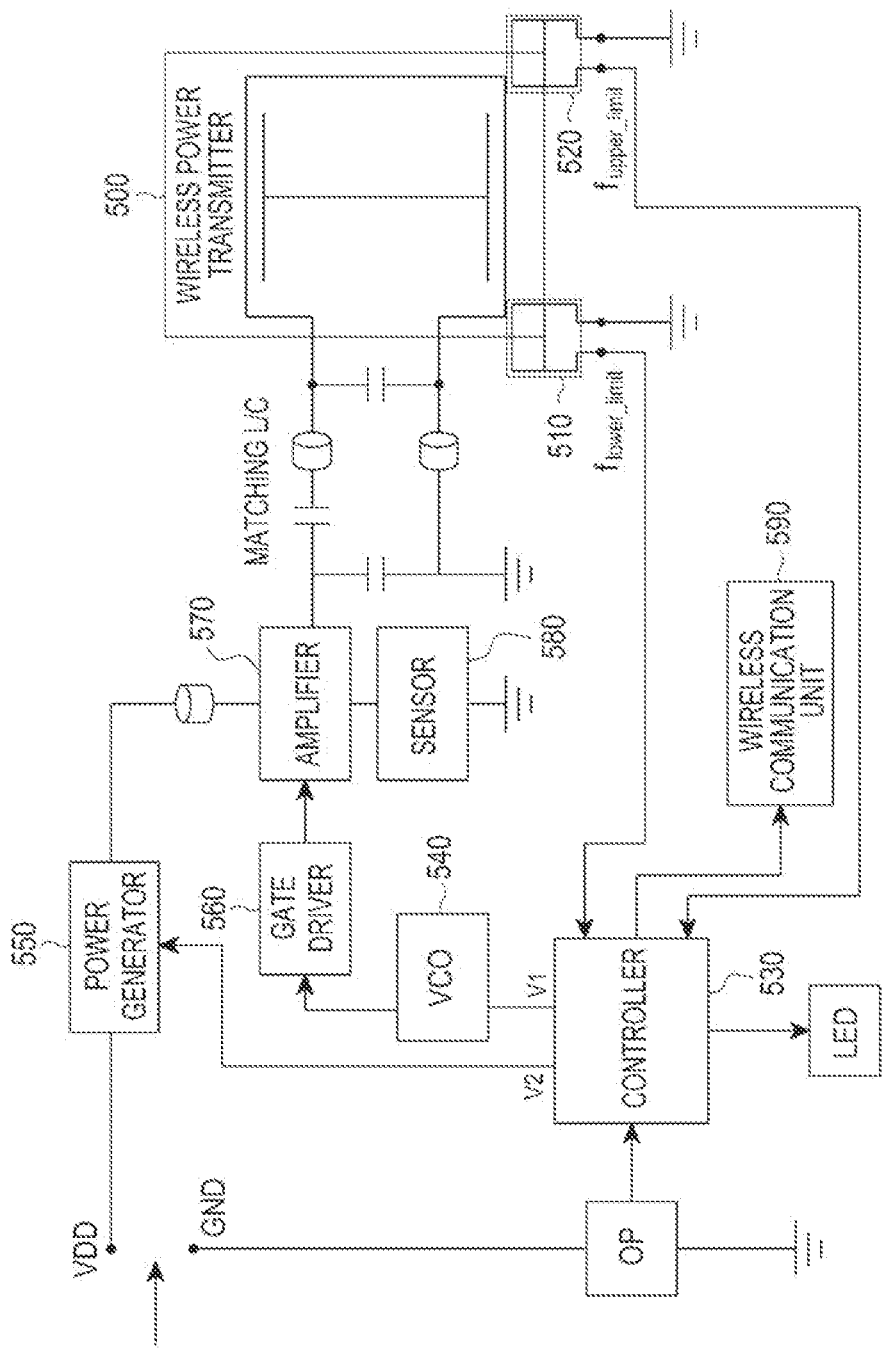
FIG. 5 illustrates a structure of a wireless charging apparatus according to an embodiment of the present invention.

Referring to FIG. 5, the wireless charging apparatus includes a wireless power transmitter 500, a first resonator 510, a second resonator 520, a controller 530, a Voltage Control Oscillator (VCO) 540, and a power generator 550, and may further include a gate driver 560, an amplifier 570, a sensor 580, and a wireless communication unit 590. Operation of the wireless charging apparatus is described below, focusing on the components related to frequency control and adjustment of output power.

Upon receiving transmission power for wireless transmission from the power generator 550, the wireless power transmitter 500 delivers the transmission power to a target to be charged. The wireless power transmitter 500 transmits the power to the target to be charged, using an initial resonant frequency.

Specifically, as for the power transmission, transmission efficiency may be optimized by inducing frequency tuning by matching the resonant frequency of the wireless power transmitter 500 with the resonant frequency of the target to be charged. In other words, the transmission efficiency may dramatically increase as resonant frequencies are matched.

However, impedance changes will occur when the target to be charged is placed on a charging deck of the wireless charging apparatus or is positioned off the charging deck. In addition, the impedance changes may occur even when power delivery is interrupted due to the full charge of the target to be charged, or when a metallic material is placed on the wireless charging apparatus. For abrupt changes in impedance, a power value exceeding a predetermined power value may occur in the outband. In some cases, even though the resonant frequency is adjusted within the inband, the power value may exceed the power limit in advance of the boundary frequency (e.g., 6.795 MHz) between the inband and the outband, as shown in FIG. 4B.

Due to such changes in impedance, transmission efficiency may be drastically reduced, so correction for the resonant frequency is required. The transmission efficiency may be increased by transmitting the optimal power through the adjustment of the resonant frequency. In particular, the present invention provides a method of outputting charging power being equal to or less than a predetermined power limit, not only in the outband but also at the boundary between the inband and the outband despite changes in the resonant frequency due to the abrupt changes in impedance.

To this end, the wireless charging apparatus of a preferred embodiment includes two resonators 510 and 520.

The first resonator 510 resonates at a lower-limit frequency of the inband, while the second resonator 520 resonates at an upper-limit frequency of the inband. In an embodiment described here, 6.78 MHz±15 kHz is used as an Industrial Scientific Medical (ISM) band designated by International Telecommunication Union-Radio communication sector (ITU-R). Accordingly, a center frequency is 6.78 MHz, a lower-limit frequency is 6.765 MHz, and an upper-limit frequency is 6.795 MHz. The lower-limit frequency is defined as $f_{lower\_limit}$, and the upper-limit frequency is defined as $f_{upper\_limit}$. Transmission power regulations for the ISM band may be represented as shown in Table 2 below.

TABLE 2

| 6.765-6.795 MHz | |
|---|---|
| In-band | Out-Band emission |
| No Restriction | .If RF power <500 W → 25 uV/m @ 300 m .If RF power >500 W (note 1) → uV/m @ 300 m |

As described above, the present invention controls the output power in the outband not to exceed the power limit.

The controller 530 sets an initial resonant frequency and transmits the power through the wireless power transmitter 500 using the set initial resonant frequency. Since the transmission efficiency may decrease due to the impedance change and other factors as discussed above, the controller 530 adjusts the resonant frequency in a predetermined inband so that the output power does not exceed a predetermined power limit.

The process of adjusting the frequency in the inband is as follows. In an embodiment of the present invention, 6.765 MHz~6.795 MHz is given as an example of the inband. In this case, the resonant frequency may be up/down-adjusted in units of several kHz.

For the adjustment of the resonant frequency, the controller 530 monitors power values output respectively from the first and second resonators 510 and 520. Based thereon, the controller 530 determines a power transmission control value. Specifically, the controller 530 periodically monitors whether the power value output from each of the first and second resonators 510 and 520 exceeds the power limit, adjusts a frequency of the power generator 550 so that the power values do not exceed the power limit, and also decreases a voltage from the VCO 540. If the power value from the first resonator 510 exceeds the power limit, the controller 530 shifts the frequency in the reverse direction. In other words, the controller 530 up-shifts the frequency by a predetermined unit frequency. On the other hand, if the power value from the second resonator 520 exceeds the power limit due to the up-shift of the frequency, the controller 530 shifts the frequency in the opposite direction of the current direction, i.e., down-shifts the frequency by a predetermined unit frequency.

The controller 530 compares each of the power values from the first and second resonators 510 and 520 with the power limit, and determines power transmission control values V1 and V2 to be delivered respectively to the VCO 540 and to the power generator 550, referring to a frequency mapping table in order to shift the frequency whose associated power exceeds the power limit. In the frequency mapping table, power transmission control values V1 and V2 to be delivered to the VCO 540 and to the power generator 550 are mapped to a respective associated frequency. For example, referring to FIG. 4B, assuming that the current resonant frequency is 6.795 MHz, a power value exceeding the power limit is output from the second resonator 520. Accordingly, power transmission control values V1 and V2 are mapped to 6.795-α MHz in the frequency mapping table to make it possible to shift the resonant frequency to 6.795-α MHz by a predetermined unit frequency of α.

As a result, the first power transmission control value V1 is delivered to the VCO 540 and the second power transmission control value V2 is delivered to the power generator 550.

The VCO 540 adjusts the frequency depending on the first power transmission control value V1 provided from the controller 530. Accordingly, the VCO 540 may up/down-adjust the current resonant frequency on a predetermined frequency basis. The controller 530 adjusts the output power by adjusting the first power transmission control value V1 to be delivered to the VCO 540. If at least one of lower-limit and upper-limit powers output from the first and second resonators 510 and 520 continues to exceed the power limit even after adjustment of the frequency within the inband so that the power value does not exceed the power limit, the controller 530 adjusts the output power by adjusting the second power transmission control value V2 to be delivered to the power generator 550.

The output power may be adjusted depending on the number of targets to be charged and their positions. For examples, if the target to be charged is placed in the position where the transmission efficiency is poor, the output power will increase. In this way, the controller 530 shifts the frequency into the inband and then finds a frequency having the maximum efficiency by gradually increasing or decreasing the voltage provided to the amplifier 570.

As described above, the resonant frequency may be shifted depending on the power transmission control value from the controller 530. By doing so, frequency tracking that shifts the frequency to a frequency having the maximum efficiency is performed, making it possible to prevent in advance the power value greater than or equal to the power limit from occurring in the outband.

The gate driver 560 of FIG. 5 matches an impedance of the wireless charging apparatus with that of the wireless power transmitter 500. Thus, the gate driver 560 delivers a specific pulse voltage corresponding to the resonant frequency adjusted by the VCO 540 to the amplifier 570 based on a signal received from a timing controller (not shown).

In response to the signal from the gate driver 560, the amplifier 570 amplifies strength of the signal from the power generator 550 to increase the power transmission efficiency.

The sensor 580 detects the approach of an object that is a target to be charged.

The wireless communication unit 590 serves to perform communication with the target to be charged, and the wireless communication unit 590 selectively uses various wireless short-range communication techniques.

Operation of the wireless charging apparatus will be described in more detail with reference to FIG. 6.

Figure 6:
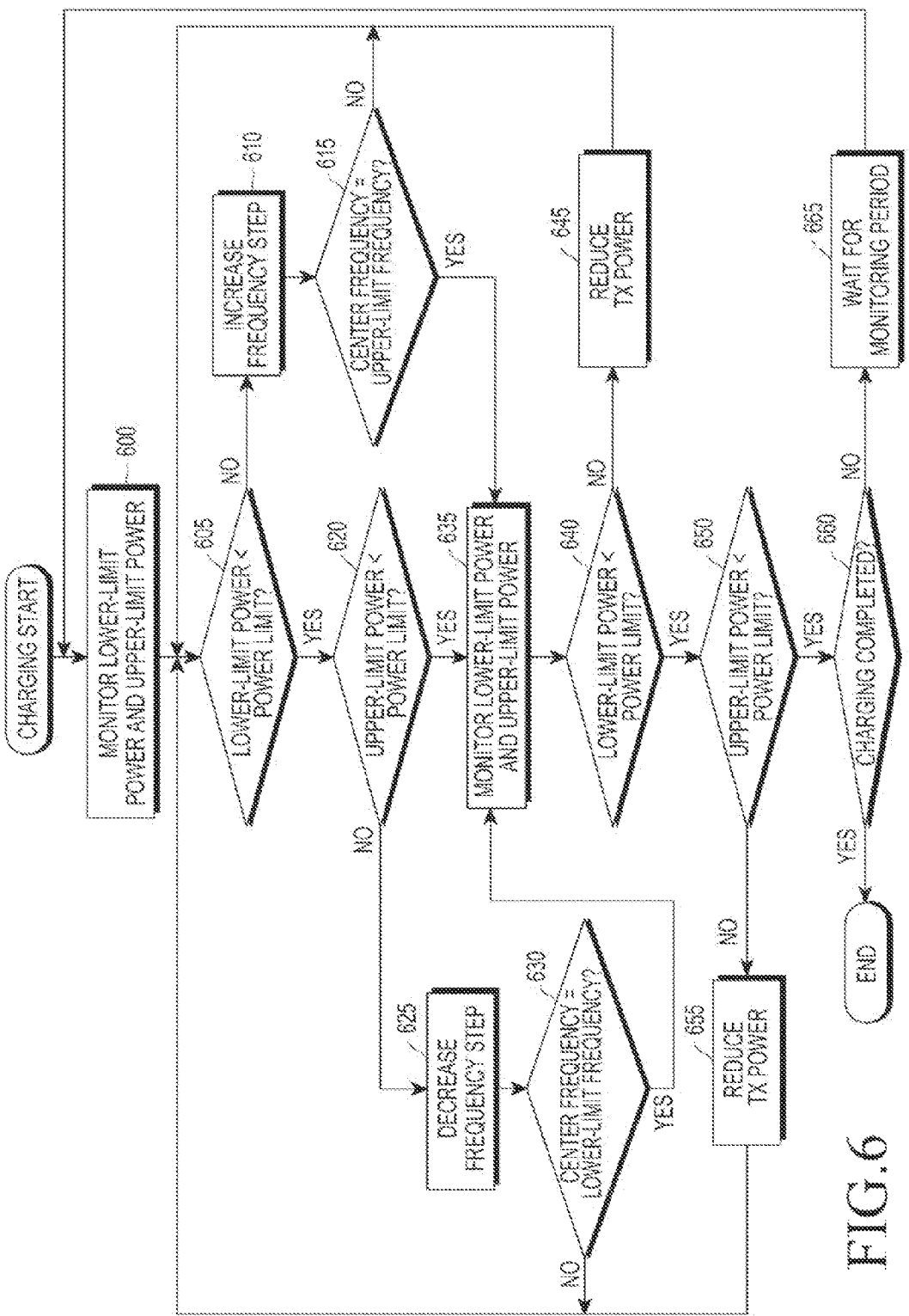
FIG. 6 is a flowchart of operation of a wireless charging apparatus for frequency tracking according to an embodiment of the present invention.

Referring to FIG. 6, when charging begins, the wireless charging apparatus transmits power using an initial resonant frequency. While transmitting the power using the initial resonant frequency, the wireless charging apparatus monitors a lower-limit power $P_{lower\_limit}$ from the first resonator 510 and an upper-limit power $P_{upper\_limit}$ from the second resonator 520 in step 600. In step 605, the wireless charging apparatus determines whether the lower-limit power $P_{lower\_limit}$ from the first resonator 510 is less than the power limit $P_{regulation\_limit}$. If the lower-limit power $P_{lower\_limit}$ is greater than or equal to the power limit $P_{regulation\_limit}$, the wireless charging apparatus increases a frequency step in step

610. Accordingly, even though the current center frequency $f_{center}$ (i.e., initial resonant frequency) exists in the inband, the lower-limit power $P_{lower\_limit}$ at the lower-limit frequency of the first resonator 510 has exceeded the power limit $P_{regulation\_limit}$. In this case, therefore, the wireless charging apparatus increases the frequency step in step 610 to up-shift the current center frequency. The frequency increases in steps in units of kHz step.

Thereafter, in step 615, the wireless charging apparatus determines whether the shifted center frequency $f_{center}$ is equal to the upper-limit frequency $f_{upper\_limit}$, to prevent the center frequency $f_{center}$ increased by a predetermined unit frequency of αkHz from exceeding the upper-limit frequency $f_{upper\_limit}$. Therefore, if the center frequency $f_{center}$ is not equal to the upper-limit frequency $f_{upper\_limit}$, the wireless charging apparatus returns to step 605. If the lower-limit power $P_{lower\_limit}$ still exceeds the power limit $P_{regulation\_limit}$ in step 605, the wireless charging apparatus increases the frequency until the center frequency $f_{center}$ reaches the upper-limit frequency $f_{upper\_limit}$ by repeating steps 610 and 615. In the meantime, if the center frequency $f_{center}$ reaches the upper-limit frequency $f_{upper\_limit}$, the wireless charging apparatus proceeds to step 635.

However, if the lower-limit power $P_{lower\_limit}$ is determined to be less than the power limit $P_{regulation\_limit}$ in step 605, the wireless charging apparatus determines in step 620 whether an upper-limit power $P_{upper\_limit}$ is less than the power limit $P_{regulation\_limit}$. If the upper-limit power $P_{upper\_limit}$ is not less than the power limit $P_{regulation\_limit}$, i.e., if the upper-limit power $P_{upper\_limit}$ exceeds the power limit $P_{regulation\_limit}$, the wireless charging apparatus applies a decrease frequency step in step 625. Since this means that the upper-limit power $P_{upper\_limit}$ at the upper-limit frequency $f_{upper\_limit}$ of the second resonator 520 exceeds the power limit $P_{regulation\_limit}$, the wireless charging apparatus will control the power by down-shifting the current center frequency $f_{center}$. If the wireless charging apparatus decreases the frequency step by a predetermined unit frequency, the center frequency $f_{center}$ is shifted to the lower-limit frequency $f_{lower\_limit}$. Thereafter, in step 630, the wireless charging apparatus determines if the center frequency $f_{center}$ is equal to the lower-limit frequency $f_{lower\_limit}$.

If the center frequency $f_{center}$ is not equal to the lower-limit frequency $f_{lower\_limit}$, the wireless charging apparatus returns to step 605. If the lower-limit frequency $P_{lower\_limit}$ is less than the power limit $P_{regulation\_limit}$ in step 605, but the upper-limit power $P_{upper\_limit}$ still exceeds the power limit $P_{regulation\_limit}$ in step 620, the wireless charging apparatus again decreases the frequency until the center frequency $f_{center}$ reaches the lower-limit frequency $f_{lower\_limit}$ by repeating steps 625 and 630. When the center frequency $f_{center}$ reaches the lower-limit frequency $f_{lower\_limit}$ in step 630, the wireless charging apparatus proceeds to step 635.

As described above, by determining whether the center frequency exists in the boundary between the inband and the outband, i.e., exists between the lower-limit frequency and the upper-limit frequency even as the center frequency increases or decreases, the wireless charging apparatus prevents the center frequency from leaving the inband and entering the outband even though the center frequency is shifted. In some cases, however, since the output power in the outband may exceed the power limit even though the center frequency exists in the inband, the wireless charging apparatus may provides an advance prevention of the output power in the outband from exceeding the power limit by measuring the power at the lower-limit and upper-limit frequencies corresponding to the boundary between the inband and the outband.

In some cases, however, the output power in the outband may exceed the power limit even though the wireless charging apparatus has shifted the frequency to the lower-limit or upper-limit frequency of the inband by decreasing or increasing the frequency. Therefore, in an embodiment of the present invention, the wireless charging apparatus controls the output power to not exceed the power limit even at the lower-limit and upper-limit frequencies. Accordingly, the wireless charging apparatus further monitors the lower-limit power $P_{lower\_limit}$ and the upper-limit power $P_{upper\_limit}$ in step 635, and determines in step 640 whether the lower-limit power $P_{lower\_limit}$ is less than the power limit $P_{regulation\_limit}$. At this time, the center frequency corresponds to the frequency that has been shifted up to the lower-limit or upper-limit frequency.

If the lower-limit power $P_{lower\_limit}$ exceeds the power limit $P_{regulation\_limit}$, the wireless charging apparatus decreases the transmission power in step 645. To this end, the controller 530 reduces the output power of the power generator 550 by adjusting the second power transmission control value V2 provided to the power generator 550 to reduce the transmission power from the wireless power transmitter 500 to the target to be charged.

On the other hand, if the lower-limit power $P_{lower\_limit}$ is less than the power limit $P_{regulation\_limit}$, the wireless charging apparatus determines in step 650 whether the upper-limit power $P_{upper\_limit}$ is less than the power limit $P_{regulation\_limit}$. If the upper-limit power $P_{upper\_limit}$ exceeds the power limit $P_{regulation\_limit}$, the wireless charging apparatus reduces the transmission power in step 655. Reducing transmission power is performed by decreasing the power transmission control value V2 provided to the power generator 550. On the other hand, if the upper-limit power $P_{upper\_limit}$ is less than the power limit $P_{regulation\_limit}$, the wireless charging apparatus determines in step 660 whether the charging has been completed. If charging is not complete, the wireless charging apparatus waits for a monitoring period in step 665 and then returns to step 600 and repeats the above-described process.

As described above, the wireless charging apparatus of the present invention detects the output power in advance before arrival at the boundary frequency between an inband and an outband during frequency tracking, making it possible to comply with the frequency regulations. In addition, the wireless charging apparatus may include an antenna-type resonator instead of using the expensive PLL, raising the price competiveness.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A wireless charging apparatus for controlling charging power, in charging a target to be charged, the apparatus comprising:
   a Voltage Control Oscillator (VCO) for outputting a resonant frequency corresponding to a first power transmission control value;
   a wireless power transmitter for outputting power determined by the resonant frequency to the target to be charged;

a first resonator connected to the wireless power transmitter for outputting a first power value at a lower-limit frequency of a predetermined frequency band;
a second resonator connected to the wireless power transmitter for outputting a second power value at an upper-limit frequency of the predetermined frequency band; and
a controller for adjusting the first power transmission control value for adjusting the resonant frequency if either the first power value or the second power value from the first and second resonators exceeds a power limit.

2. The wireless charging apparatus of claim 1, wherein, if the first power value exceeds the power limit, the controller shifts the resonant frequency towards the upper-limit frequency by a predetermined unit frequency by adjusting the first power transmission control value.

3. The wireless charging apparatus of claim 2, wherein the controller determines whether the shifted resonant frequency is equal to the upper-limit frequency and, if the shifted resonant frequency is not equal to the upper-limit frequency, the controller further shifts the resonant frequency towards the upper-limit frequency by the predetermined unit frequency by adjusting the first power transmission control value when the first power value exceeds the power limit.

4. The wireless charging apparatus of claim 1, wherein, if the second power value exceeds the power limit, the controller shifts the resonant frequency towards the lower-limit frequency by a predetermined unit frequency by adjusting the first power transmission control value.

5. The wireless charging apparatus of claim 4, wherein the controller determines whether the shifted resonant frequency is equal to the lower-limit frequency and, if the shifted resonant frequency is not equal to the lower-limit frequency, the controller further shifts the resonant frequency towards the lower-limit frequency by the predetermined unit frequency by adjusting the first power transmission control value when the second power value exceeds the power limit.

6. The wireless charging apparatus of claim 1, further comprising a power generator for delivering power corresponding to a second power transmission control value from the controller to the wireless power transmitter.

7. The wireless charging apparatus of claim 6, wherein, if the adjusted resonant frequency is equal to the upper-limit frequency or to the lower-limit frequency, the controller determines that the first power value from the first resonator or that the second power value from the second resonator exceeds the power limit, respectively.

8. The wireless charging apparatus of claim 7, wherein if any one of the first and second power values from the first and second resonators exceeds the power limit, the controller decreases the second power transmission control value to reduce output power from the wireless power transmitter.

9. The wireless charging apparatus of claim 8, wherein the controller refers to a table in which predetermined first and second power transmission control values are mapped to a respective associated frequency to determine the first power transmission control value and the second power transmission control value.

10. A method for controlling charging power in a wireless charging apparatus with a wireless power transmitter, the method comprising:
outputting power determined by a resonant frequency to a target to be charged by the wireless power transmitter;
monitoring a first power value at a lower-limit frequency and a second power value at an upper-limit frequency from the wireless power transmitter while outputting the power;
determining whether the first power value or the second power value exceeds a power limit; and
adjusting the resonant frequency if the first power value or the second power value exceeds the power limit.

11. The method of claim 10, wherein adjusting the resonant frequency comprises, if the first power value exceeds the power limit, shifting the resonant frequency towards the upper-limit frequency by a predetermined unit frequency.

12. The method of claim 11, further comprising:
determining whether the shifted resonant frequency is equal to the upper-limit frequency; and
if the shifted resonant frequency is not equal to the upper-limit frequency, further shifting the resonant frequency towards the upper-limit frequency by the predetermined unit frequency when the first power value exceeds the power limit.

13. The method of claim 10, wherein adjusting the resonant frequency comprises, if the second power value exceeds the power limit, shifting the resonant frequency towards the lower-limit frequency by a predetermined unit frequency.

14. The method of claim 10, further comprising:
determining whether the adjusted resonant frequency is equal to the lower-limit frequency; and
if the adjusted resonant frequency is not equal to the lower-limit frequency, further shifting the resonant frequency towards the lower-limit frequency by the predetermined unit frequency when the second power value exceeds the power limit.

15. The method of claim 11, further comprising:
determining whether the adjusted resonant frequency is equal to the upper-limit frequency or to the lower-limit frequency;
if the adjusted resonant frequency is equal to the upper-limit frequency or to the lower-limit frequency, determining whether the first power value or the second power value exceeds the power limit; and
if either the first power value or the second power value exceeds the power limit, reducing power delivered to the wireless power transmitter to reduce output power from the wireless power transmitter.

* * * * *